US012602799B2

(12) United States Patent
Piper

(10) Patent No.: US 12,602,799 B2
(45) Date of Patent: Apr. 14, 2026

(54) REGISTRATION CHAINING WITH INFORMATION TRANSFER

(71) Applicant: MIM SOFTWARE INC., Cleveland, OH (US)

(72) Inventor: Jonathan William Piper, Orange, OH (US)

(73) Assignee: MIM SOFTWARE INC., Cleveland, OH (US)

( * ) Notice: Subject to any disclaimer, the term of this patent is extended or adjusted under 35 U.S.C. 154(b) by 757 days.

(21) Appl. No.: 17/884,109

(22) Filed: Aug. 9, 2022

(65) Prior Publication Data

US 2023/0051081 A1 Feb. 16, 2023

Related U.S. Application Data

(60) Provisional application No. 63/231,810, filed on Aug. 11, 2021.

(51) Int. Cl.
| | |
|---|---|
| *G06T 7/33* | (2017.01) |
| *G06T 5/50* | (2006.01) |
| *G06T 7/00* | (2017.01) |

(52) U.S. Cl.
CPC ................ *G06T 7/337* (2017.01); *G06T 5/50* (2013.01); *G06T 7/0014* (2013.01)

(58) Field of Classification Search
CPC ......... G06T 7/337; G06T 5/50; G06T 7/0014; G06T 7/33; G06T 2207/10081; G06T 2207/10088; G06T 2207/10132; G06T 2207/30081; G06T 2207/30204
See application file for complete search history.

(56) References Cited

U.S. PATENT DOCUMENTS

| | | | |
|---|---|---|---|
| 7,831,293 B2 | 11/2010 | Ellis et al. | |
| 10,321,054 B2 * | 6/2019 | Chen .................... | H04N 23/951 |
| 2003/0128280 A1 * | 7/2003 | Perlmutter ................ | G06T 5/50 |
| | | | 348/222.1 |
| 2007/0177780 A1 | 8/2007 | Chui | |
| 2011/0150277 A1 * | 6/2011 | Ishii ........................ | G06T 7/248 |
| | | | 382/103 |
| 2011/0211726 A1 * | 9/2011 | Moed ................. | G06V 10/7515 |
| | | | 712/E9.002 |
| 2015/0379708 A1 * | 12/2015 | Abramoff ........... | G06F 18/2135 |
| | | | 382/128 |
| 2016/0008074 A1 * | 1/2016 | Glossop ................. | A61B 90/11 |
| | | | 606/130 |
| 2017/0014203 A1 * | 1/2017 | De Mathelin .......... | A61B 5/066 |
| 2019/0318463 A1 * | 10/2019 | Zhang ........................ | G06T 5/73 |
| 2020/0357147 A1 * | 11/2020 | Lu .............................. | G06T 5/50 |
| 2021/0059762 A1 | 3/2021 | Ng | |
| 2021/0201485 A1 * | 7/2021 | Chukka ................ | G06V 20/695 |

OTHER PUBLICATIONS

Internation Preliminary Report on Patentability; PCT/US2022/039821; Feb. 13, 2024; 9 pages.

* cited by examiner

*Primary Examiner* — Qun Shen
(74) *Attorney, Agent, or Firm* — TUCKER ELLIS LLP

(57) ABSTRACT

A registration chaining system provides information transfer along a chain of registrations of images of same or different modalities. A registration at each link is based on a shared feature readily distinguished in a pair of images. The information is transferred using the registration.

19 Claims, 5 Drawing Sheets

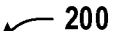

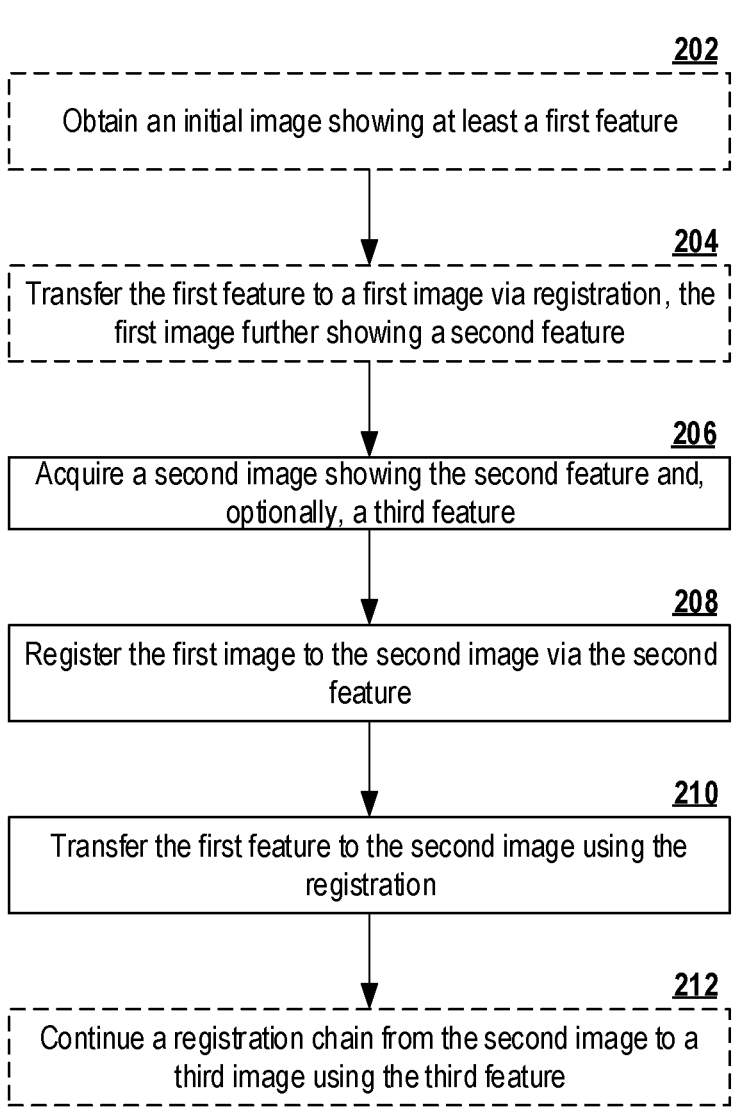

200

202

Obtain an initial image showing at least a first feature

204

Transfer the first feature to a first image via registration, the first image further showing a second feature

206

Acquire a second image showing the second feature and, optionally, a third feature

208

Register the first image to the second image via the second feature

210

Transfer the first feature to the second image using the registration

212

Continue a registration chain from the second image to a third image using the third feature

FIG. 2

REGISTRATION CHAINING WITH INFORMATION TRANSFER

CROSS-REFERENCE TO RELATED APPLICATIONS

This application claims the benefit of and priority to U.S. Provisional Application No. 63/231,810, filed on Aug. 11, 2021. The entirety of the aforementioned application is incorporated herein by reference.

TECHNICAL FIELD

This application relates generally to image fusion and, more particularly, to systems and methods for chaining registrations with information transfer.

BACKGROUND OF THE INVENTION

Image registration is a determination of a transformation that aligns locations in one image to locations in another image. In medical imaging, registration is particularly useful to integrate or otherwise correlate information acquired from disparate images. For example, patient images acquired at different times can be compared to understand disease progression, to design therapy strategies, to determine treatment effectiveness, and so on. In another example, patient images can be compared with various reference images (e.g., atlases, normal templates, disease templates, etc.) for diagnostic purposes. While medical imaging technology enables unique views of a patient to be obtained, registration of medical images increases the power of the information.

Image fusion, which is enabled by image registration, generally relates to combining information from different images into a single, composite image. In medical imaging, for instance, fusion can involve registering and combining different images, in some manner, to generate a composite image. The composite image can provide improved image quality or enhance usability of the images for diagnosis, treatment planning and assessment, tracking disease progression, etc. In medical imaging, the two or more images fused can be of the same imaging modality or different imaging modalities. Multiple images of the same modality may be fused to ascertain disease progression or treatment efficacy. Images of different modalities can be combined to leverage benefits of the differing modalities for planning purposes or for convenience.

For instance, magnetic resonance imaging (MRI) provides good soft tissue contrast. Thus, MRI enables relatively easy differentiation of lesions or other abnormalities from healthy tissue. Accordingly, MRI performs well for detection and planning. MRI, however, can be inconvenient for intra-operative guidance due to cost and non-portability of the imaging machine. For example, some procedures (e.g., taking a biopsies of a prostate) may often be guided by ultrasound, which is portable and provides high spatial resolution. Compared to MRI, however, ultrasound provides less tissue discrimination. An MRI-ultrasound fusion can combine information from the respective modalities to improve execution of the procedure.

BRIEF SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a system and associated methods are provided for transferring feature information via a registration chain. A first image is acquired that shows a first feature and a second feature. A second image is acquired that shows the second feature. The first and second images are registered on the basis of the second feature. Using the registration, the first feature is transferred to the second image. According to an aspect, the first feature may not be readily visible in the second image. Further, the first image and the second image may be acquired at different stages of a procedure that alters surrounding structures such that a position and orientation of the first feature may change. This process may be repeated with additional images such as the second image and a third image on the basis of a third feature.

These and other embodiments are described in more detail below.

BRIEF DESCRIPTION OF THE DRAWING

Various non-limiting embodiments are further described with reference the accompanying drawings in which:

FIG. 2 is a flow diagram of an exemplary, non-limiting method for chaining registrations with information transfer in accordance with various aspects;

DETAILED DESCRIPTION OF THE INVENTION

Figure 1:
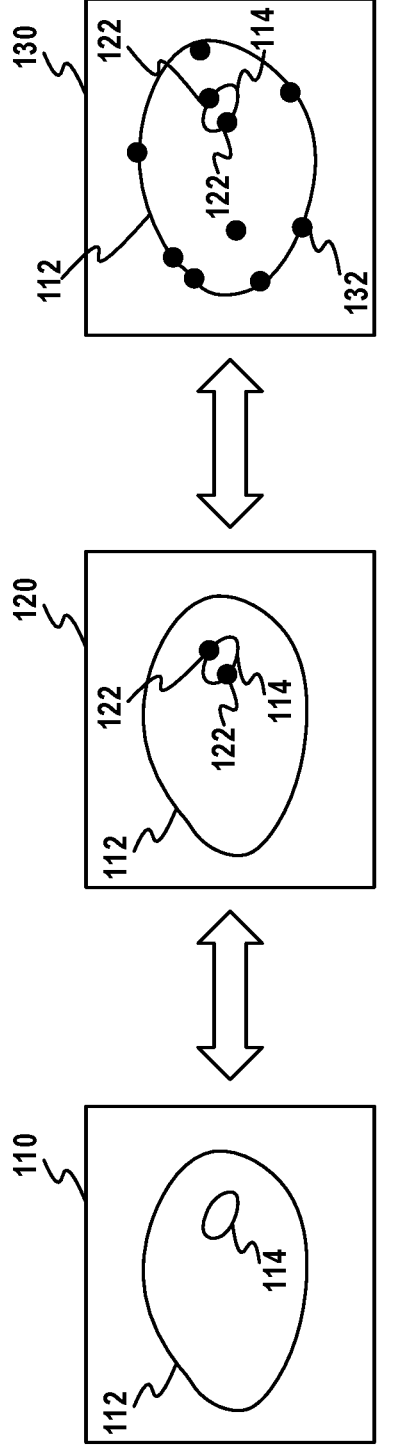
FIG. 1 is an exemplary, non-limiting embodiment of a registration chaining technique according to one or more aspects.

As discussed in the background, medical image fusion can leverage strengths of different imaging modalities and generate combined information having a wide array of applications. For instance, a fusion of MRI and ultrasound images can provide intra-procedural imaging with accurate identification of anatomical features. In one example, brachytherapy of a lesion of a prostate can benefit from image fusion. Brachytherapy may involve an image-guided procedure with, for example, an ultrasound (US) probe aimed at the prostate. Initial scan data may be fused with other imaging (e.g. MRI) in fusion software. With the fused image data, a lesion and/or other anatomical features (e.g. prostate, urethra, etc.) may be contoured and indicated over the US image data even though such features are not readily visible in US.

In an example brachytherapy workflow, applicators (e.g. catheters) for a radiation source are placed with guidance from a fusion of MR (lesion and prostate visible) and US (prostate visible). Actual placement is performed with US imaging. In a typical workflow, a relationship between the applicators and the lesion is valuable to plan placement of radiation sources and/or dosimetry. Placing the catheters, however, affects an initial fusion of MR to US. For instance, the catheters occlude US imaging and, further, the anatomy deforms due to the catheters (e.g. swells). Thus, confidence in the final registration relationship is typically low.

In various, non-limiting embodiments, a system and associated methods are provided for registration chaining with information transfer. In an aspect, the technique described herein involves a step-wise placement of an object (e.g. a fiducial marker, catheter, needle, etc.) and registration to bridge an initial scan to a final scan. A first image may be acquired after placement of a first object or first set of objects. In some examples, however, the first image may be acquired before placement of the first object or first set of objects. A second object or second set of objects may be placed and a second image is captured. The first object or first set of objects may be readily visible in both the first and second images. Accordingly, a registration of the first image and the second image may be based on and verified by the first object(s). The first image may have additional information or show other features that are visible or partially occluded in the second image. The additional information or other features may affected by the placement of the second object(s). This information, however, may be transferred to the second image via the registration. Additional placement and/or imaging steps may be performed thereafter linked via successive registrations. Each registration in the chain enables a transfer of information from a previous link, which may be invisible or become obscured as a result of the procedure.

In a brachytherapy example, an initial US image may show a prostate and a lesion (transferred from an MR image, for example). A first set of catheters may be placed through the lesion in an image-guiding process. An image acquired after this step establishes a spatial relationship, or pose, between the lesion and the initial set of catheters. Thereafter, remaining catheters may be placed. As noted above, this placement may alter or obscure the anatomy. A final image after placement of the remaining catheters may be registered to a previous image (e.g. with initial catheters) based on the initial set of catheters, which are visible in both images. With this registration chain, the lesion from the initial US image may be transferred to the final image.

More specifically, an exemplary chain for high dose rate (HDR) brachytherapy, according to aspects described herein, may include three links. In a first link, an MR image shows a lesion and prostate and a US image shows the prostate. These images may be registered using the prostate and the lesion is transferred to the US image. In a second link, a US image shows the lesion and a set of initial catheters through the lesion. Another image is acquired after placing all catheters. This image shows the initial catheters as well. This image is registered to the US image showing the lesion and initial catheters using the initial catheters. Thereafter, the lesion is transferred using the registration. In an optional third link, a CT image with all catheters is acquired. The CT image is registered with the US image showing the lesion and all catheters on the basis of the catheters visible in both images. Using this registration, the lesion is transferred to the CT image for further treatment planning.

In one embodiment, a system is provided. The system includes a processor coupled to memory storing computer-executable instructions that, when executed configure the processor to perform various steps. For example, the instructions may configure the processor to obtain a first image with a first feature and a second feature. The processor is further configured to acquire a second image with at least the second feature. Further, the processor is configured to generate a registration of the first image to the second image based at least in part on the second feature. In addition, the processor may be configured to transfer feature information associated with the first feature to the second image using the registration of the first image to the second image.

In various examples, the first feature is transferred to the first image from an initial image. The second feature is visible in the first image and the second image. The first feature is not visible in the second image. The processor is configured to verify the registration using the second feature.

Moreover, a third feature is visible in the second image. The third feature is not visible in the first image. The processor may be further configured to generate a second registration of the second image to a third image using the third feature, and to transfer at least one of feature information associated with the first feature or feature information associated with the second feature to the third image using the second registration.

In some example, the second image may not have any other features having independent value, but shares the second feature in common with the first image and shares the third feature in common with the third image. In addition, a state at which the second image is acquired may be transient and may be during a procedure. For instance, the second image is acquired partway through a procedure where there is no reason to pause the procedure other than to acquire the second image. The second image is acquired at a point where the second feature and the third feature are at least partially visible so as to be useful in a registration chain. That is, the time at which the second image is acquired is late enough in a procedure to include suitable visible features (e.g. the second feature and/or third feature), but not too late such that those features are no longer visible.

In another implementation, a method is provided. The method may include receiving a first image having a first feature and a second feature. The method may also include obtaining a second image with at least the second feature. In addition, the method includes generating a registration of the first image to the second image based at least in part on the second feature, and transferring feature information associated with the first image to the second image using the registration.

According to one or more examples, a procedure is performed between a time at which the first image is acquired and a time at which the second image is acquired. The procedure alters a structure visible in the first image and the second image. The second feature may be placed via the procedure. The first feature is at least partially obscured in the second image. The method may further include verifying the registration using the second feature.

In further examples, the second image may include a third feature and the method may also include: acquiring a third image that includes the third image; generating a second registration of the second image to the third image using the third feature; and transferring at least one of feature information associated with the first feature to the third image using the second registration. The method also include transferring the first feature to the first image from an initial image in which the first feature is visible.

In yet another implementation, a non-transitory, computer-readable storage medium is provided. The computer-readable storage medium stores computer-executable instructions for a registration chaining engine. The instructions, when executed, configure a processor to: receive a first image having a first feature and a second feature visible, the first image being acquired after a first step of a procedure; acquire a second image after a second step of a procedure, the second image having at least the second feature visible; register the first image to the second image based on the second feature; and transfer feature information associated with the first feature to the second image based on the registration.

According to various examples, the computer-readable storage medium may further store instructions that configure the processor to: acquire a third image following the procedure, the third image having a third feature visible, the third feature also being visible in the second image; register the second image to the third image based on the third feature; and transfer feature information associated with the first feature to the third image based on the registration of the second image to the third image. The medium may further store instructions that configure the processor to transfer the first feature to the first image from an initial image acquired prior to the procedure. The first image, second image, and third image have different modalities.

As mentioned above, in various embodiments, a registration chain using a shared feature at each link can be utilized to transfer desired information along the chain that may otherwise become obscured during a procedure. While aspects herein are described in connection with an example HDR brachytherapy procedure, it is to be appreciated that the described systems and methods are applicable to other procedures.

FIG. 1 illustrates an exemplary, non-limiting embodiment of a registration chaining technique. As shown in FIG. 1, an initial image 110 shows features 112 and 114. Features 112 and 114 may be visible in image 110 and further indicated by associated feature information that describes respective poses of features 112 and 114 in image 110. In general, the term "feature information" relates to imaging or other data that specifies a pose of a feature or object in images. As utilized herein, the term "pose" refers to a position and orientation of an object in a given frame of reference, which can be defined relative to another object. By way of example, the pose of a feature in an image relates to the position and orientation of the feature as shown in the image or within the imaging space or volume.

In an example, image 110 may be a first modality suitable for intra-procedure imaging. One of feature 112 or 114 may not be readily visible in the first modality. Accordingly, image 110 may include transferred information or fusion information. For instance, one of feature 112 or 114 may be readily visible in a different modality, but not the first modality. Further, the other of feature 112 or 114 may be visible in both modalities. An image in the different modality is registered to the image in the first modality using the feature visible in both. Using the registration, the other feature may be transferred or fused to generate initial image 110 shown in FIG. 1. In an exemplary brachytherapy workflow, initial image 110 may be a MR-US fusion. Specifically, initial image 110 may be a US image with information transferred from a related MR image.

According to a first step of an image-guided procedure, a first set of markers 122 may be placed. Markers 122 may be visible in the first modality and, thus, are shown in image 120 acquired after placement. In an example, markers 122 may be placed in relation to feature 114, thereby linking markers 122 and feature 114. At this stage, structures in image 120 are not greatly impacted by the placement of markers 122. Accordingly, the fusion information (e.g., feature information associated with features 112 and/or 114) remains accurate, useful, and verifiable. In the exemplary brachytherapy workflow, markers 122 may be a set of initial applicators or catheters placed through feature 114, which may be a lesion, for instance.

After acquisition of image 120, a second step of the image-guided procedure may be performed. During this step, a second set of markers 132 are placed at various points of features 112 and/or 114. Image 130 is acquired after the second step and may also be of the first modality. Placement of markers 132 may alter or obscure features 112 and 114. Thus, fusion information may no longer accurately describe those features confidently or the accuracy may not be verifiable.

As shown in FIG. 1, the first set of markers 122 (linked with feature 114) are visible in image 130. Accordingly, image 120 may be registered to image 130 based on markers 122, which are visible in both. Using this registration, feature information associated with features 112 and/or 114 may be transferred from image 120 to image 130. For instance, feature 114 may be a desirable feature mostly obscured in image 130. Feature information corresponding to feature 114 may be transferred from image 120 to image 130 using the registration. Accordingly, using the technique described above, feature information for feature 114 may be carried from the initial image 110 to image 130.

In a subsequent and optional step, a further image of a second modality may be acquired after image 130. Marker 122 and 132 may be visible in the second modality. Thus, this further image may be registered to image 130 and, via this registration, feature 114 may be transferred to the further image. In the brachytherapy example, the further image may be a CT image and image 130 may be a final US image. The CT image, with lesion information transferred from the US image, may be suitable for further treatment planning.

As described above, a valuable feature (e.g. feature 114) may be initially imaged in a suitable modality, such as MR, and transferred to a first modality (e.g. US) suitable for intra-procedure imaging. A series of step-wise registrations after placement of a first set of markers 122 and after placement of a second set of markers 132 enables transfer of the valuable feature to a final image in the first modality despite likely structural changes due to the procedure. The final image (e.g. US image) with all markers can be registered to an image in a second modality (e.g. CT) and, through that registration, the valuable feature can be transferred to the CT image.

FIG. 2 illustrates a flow diagram of an exemplary, non-limiting method 200 for chaining registrations with information transfer. Method 200 may begin at 202, an optional step, where an initial image that shows at least a first feature is obtained. The initial image may be in an initial modality best suited for imaging the first feature. For instance, the initial image may be an MR image showing a lesion in an anatomical structure, such as a prostate. MR is a modality capable of distinguishing the lesion from the prostate.

At 204, another optional step, the first feature is transferred, via a registration, to a first image. The first image may be in a first modality, different from the initial modality. For instance, the first image may be a US image showing the anatomical structure (e.g. prostate), but not readily imaging the lesion (e.g. the first feature). Via a MR-US fusion (e.g. using the prostate), the lesion can be transferred to the US image.

The first image further shows a second feature. The second feature may be a marker placed in a procedure guided by intra-procedure imaging. The intra-procedure imaging may be the first modality. Further, the first image may be registered to a pre-placement image of the first modality. The pre-placement image, in an example, may be an initial scan before or at the start of the procedure. The first feature may initially be transferred from the initial image to the pre-placement image and, subsequently, transferred, via a registration, to the first image after placement of the markers. In another example, the second feature may be a set of initial catheters placed to intersect the first feature (e.g. lesion) in the anatomical structure (e.g. prostate).

At 206, a second image is acquired. The second image shows the second feature and, optionally, a third feature. The second image, in an example, may be the first modality and acquired after a further step of a procedure that alters the anatomical structure. For instance, the further step may involve introduction of the third feature, which may be placement of additional markers (e.g. catheters), separate from the initial set of catheters (e.g. the second feature). This placement may results in swelling to the anatomical structure (e.g. prostate) and/or obscures the anatomical structure. Thus, a pose of the first feature relative to the anatomical structure may change.

At 208, to account for these changes, the first image is registered to the second image via the second feature, which is visible in both images. At 210, using this registration, feature information associated with the first feature is transferred to the second image. Accordingly, an accurate indication of the first feature in the second image may be maintained despite changes to the broader anatomical structures and/or the degradation of imaging quality.

In an optional step 212, the registration chain can be continued, using the third feature, from the second image to a third image, in which the third feature is also visible. Similarly, the first feature may be transferred to the third image via this registration.

Figure 3:
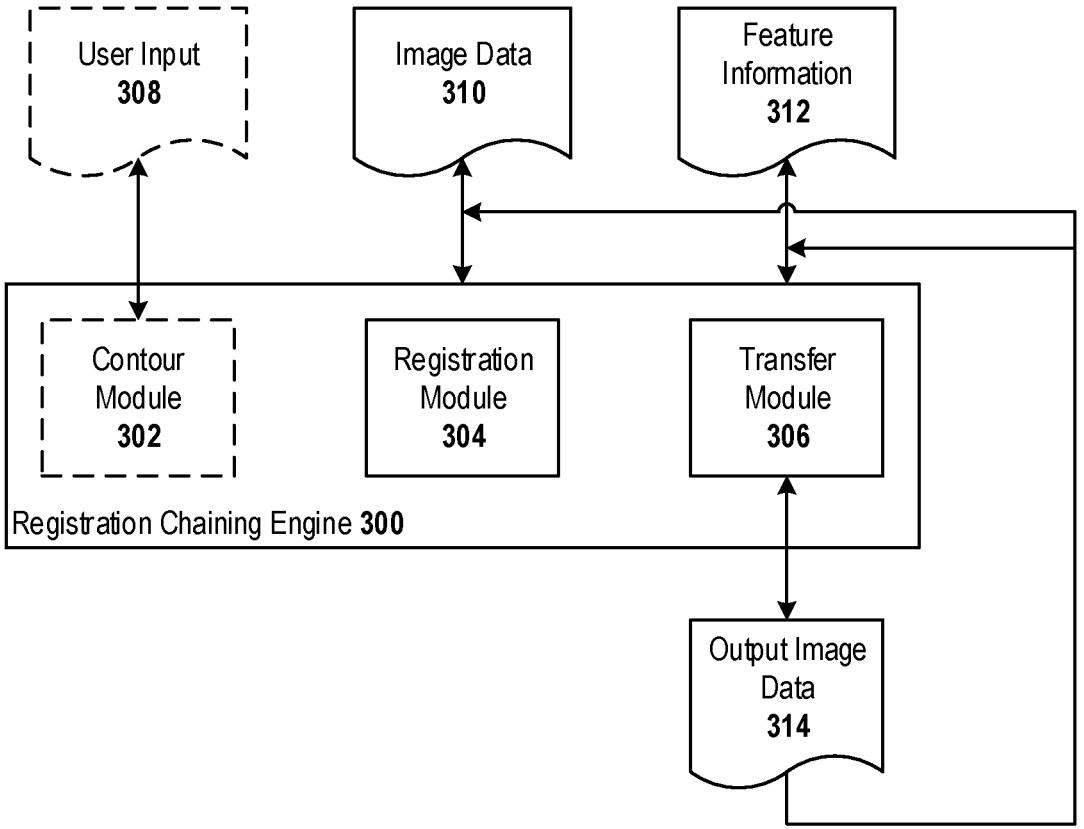
FIG. 3 is a schematic block diagram of an exemplary, non-limiting embodiment for registration chaining engine according to one or more aspects.

Turning now to FIG. 3, a block diagram of an exemplary, non-limiting registration engine 300 is depicted. As shown in FIG. 3, registration chaining engine 300 can include various functional modules implemented by computer-executable instructions. The modules can include a contour module 302, a registration module 304, and transfer module 306.

Contour module 302 include automatic and/or manual tools for contouring features of images. For example, contour module 302 can receive user input 308 and image data 310 and generate feature information 312. In general, the term "feature information" relates to imaging or other data that specifies a pose of a feature or object in images. As utilized herein, the term "pose" refers to a position and orientation of an object in a given frame of reference, which can be defined relative to another object. By way of example, the pose of a feature in an image relates to the position and orientation of the feature as shown in the image or within the imaging space or volume. Alternatively, the image data 310 and/or feature information 312 may be input to registration chaining engine 300 from an external source.

Registration module 304 registers two or more images, from image data 310, to each other. The images may be the same or different modalities. As described above, registration module 304 may leverage shared features of the two or more images (e.g. features readily visible in all images or in pairs of images) to generate registrations.

Transfer module 306 utilizes the registrations generated by the registration module 304 to transfer feature information 312 from one image to another. Feature information 312, for example, may be associated with one of the images of image data 310. Via a registration of that image to another, the feature information may be transferred to generate output image data 314.

As described above, output image data 314 may be feedback to registration chaining engine 300 as image data 310 and/or feature information 312 to continue a registration chain.

Figure 4:
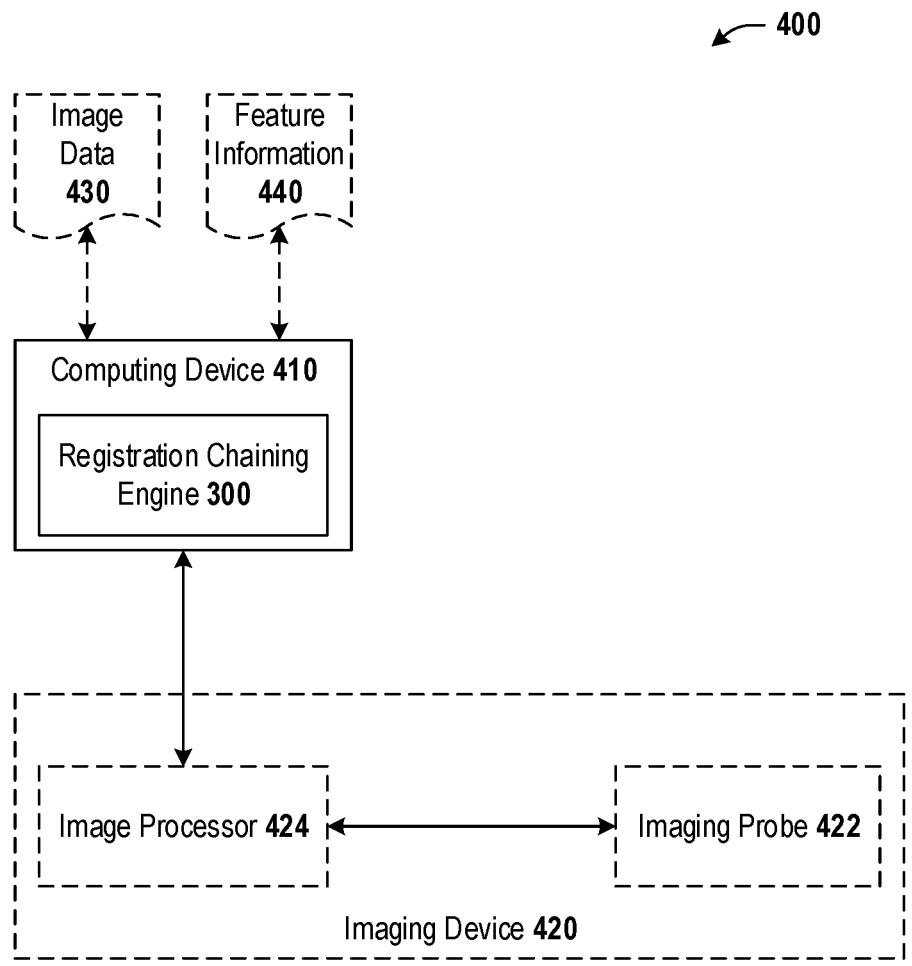
FIG. 4 is a schematic block diagram of an exemplary, non-limiting embodiment for a registration chaining system in accordance with one or more aspects.

Turning to FIG. 4, illustrated is a schematic block diagram of an exemplary, non-limiting embodiment for a registration chaining system 400. As shown, system 400 can include a computing device 410 and an imaging device 420. The computing device 110 can include a processor and various computer-readable storage media (e.g., volatile and non-volatile). The computer-readable storage media can store computer-executable instructions implementing at least a portion of functional modules comprising registration chaining engine 300, described herein. When the computer-executable instructions are executed by the processor, the system 400 is thus configured to perform the operations described herein, such as those of method 200 described above.

Computing device 410 can further include various hardware devices (not shown) to implement portions of registration chaining engine 300. For instance, computing device 410 can include a graphics device having a graphics processing unit (GPU), dedicated memory, and/or hardware interfaces to couple the graphics device to a display. Moreover, computing device 410 can include physical hardware ports and/or wireless interfaces (e.g., Bluetooth, wireless USB, etc.) to couple computing device 410 to various devices of system 300, such as, but not limited to imaging device 420.

Imaging device 420, as shown, can include an imaging probe 422 and an image processor 424. In an aspect, imaging device 420 can be a portable device suitable for intra-procedural imaging, such as an ultrasound imaging device. Nonetheless, it is to be appreciated that features and aspects described and claimed herein are not limited to ultrasound applications and can be readily adapted for use with other imaging modalities or with multiple imaging modalities. For example, in an HDR procedure, there may be MR imaging, US imaging, and CT imaging. In the ultrasound example, imaging probe 422 can include one or more transducer arrays configures to emit ultrasonic pulses and receive echoes. The echoes can be converted to electrical signals and provided to image processor 424 to generate an ultrasound image.

Figure 5:
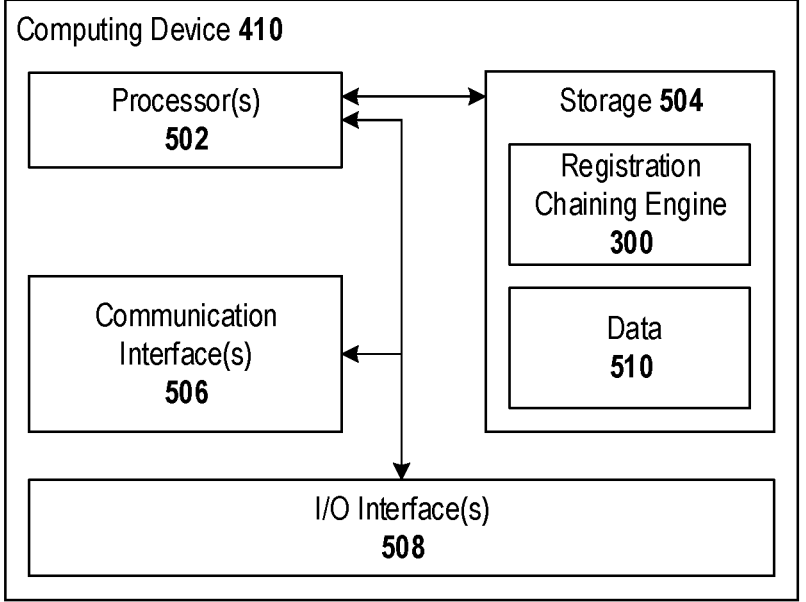
FIG. 5 is a schematic block diagram of an exemplary, non-limiting embodiment for a computing device associated with the registration chaining system of FIG. 4.

Registration chaining engine 300, according to an aspect, enables transfer of a valuable feature through one or more images captured by imaging device 420. Registration chaining engine 300 utilizes image data 130, which can include previously acquired image data of a different modality, for example, and/or feature information 440 describing the valuable feature to carry feature information of the valuable feature through step-wise images of the imaging device 420 captured during a procedure. The procedure, according to an aspect, may alter imaged structures. Step-wise registrations between successive images using shared features that are readily visible in each image pair enables accurate transfer of feature information along a chain of registrations and images FIG. 5 illustrates a schematic block diagram of an exemplary, non-limiting embodiment for a computing device 410 associated with system 400 of FIG. 4. As shown in FIG. 5, computing device 410 includes one or more processor(s) 502 configured to execute computer-executable instructions such as instructions composing registration chaining engine

300. Such computer-executable instructions can be stored on one or more computer-readable media including non-transitory, computer-readable storage media such as storage 504. For instance, storage 504 can include non-volatile storage to persistently store registration chaining engine 300 and/or data 510 (e.g., image data, feature information, working data, etc.). Storage 504 can also include volatile storage that stores registration chaining engine 300 and other data 510 (or portions thereof) during execution by processor 502.

Computing device 410 includes a communication interface 506 to couple computing device 410 to various remote systems (e.g. an image data store, an imaging apparatus, etc.). Communication interface 506 can be a wired or wireless interface including, but not limited, a WiFi interface, an Ethernet interface, a fiber optic interface, a cellular radio interface, a satellite interface, etc. An I/O interface 508 is also provided to couple computing device 410 to various input and output devices such as displays, touch screens, keyboards, mice, touchpads, etc. By way of example, I/O interface 508 can include wired or wireless interfaces such as, but not limited to, a USB interface, a serial interface, a WiFi interface, a short-range RF interface (Bluetooth), an infrared interface, a near-field communication (NFC) interface, etc.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such features may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof

What is claimed is:

1. A system, comprising:
   a processor coupled to memory storing computer-executable instructions that, when executed by the processor, configure the processor to:
   obtain a first image with a first feature and a second feature, wherein feature information associated with the first feature, which indicates the first feature in the first image, is transferred to the first image from an initial image via a registration between the first image and the initial image, wherein the initial image is different from the first image;
   acquire a second image with at least the second feature, the second image being different from the first image and the initial image:
   generate a registration of the first image to the second image based at least in part on the second feature included in both the first image and the second image; and
   transfer the feature information associated with the first feature to the second image using the registration of the first image to the second image, wherein, after the transfer, the feature information associated with the first feature indicates the first feature in the second image.

2. The system of claim 1, wherein the second feature is visible in the first image and the second image.

3. The system of claim 1, wherein the first feature is not visible in the second image.

4. The system of claim 1, wherein the processor is further configured to verify the registration using the second feature.

5. The system of claim 1, wherein a third feature is visible in the second image.

6. The system of claim 5, wherein the third feature is not visible in the first image.

7. The system of claim 5, wherein the processor is further configured to:
   generate a second registration of the second image to a third image using the third feature; and
   transfer at least one of the feature information associated with the first feature or feature information associated with the second feature to the third image using the second registration.

8. A method, comprising:
   receiving a first image having a first feature and a second feature, wherein feature information associated with the first feature, which indicates the first feature in the first image, is transferred to the first image from an initial image via a registration between the first image and the initial image, wherein the initial image is different from the first image;

obtaining a second image with at least the second feature, the second image being different from the first image and the initial image;

generating a registration of the first image to the second image based at least in part on the second feature included in both the first image and the second image; and transferring the feature information associated with the first feature to the second image using the registration, wherein, after the transfer, the feature information associated with the first feature indicates the first feature in the second image.

9. The method of claim 8, wherein a procedure is performed between a time at which the first image is acquired and a time at which the second image is acquired, the procedure altering a structure visible in the first image and the second image.

10. The method of claim 9, wherein the second feature is placed via the procedure.

11. The method of claim 8, wherein the first feature is at least partially obscured in the second image.

12. The method of claim 8, further comprising verifying the registration using the second feature.

13. The method of claim 8, wherein the second image further includes a third feature.

14. The method of claim 13, further comprising:

acquiring a third image that includes the third feature;

generating a second registration of the second image to the third image using the third feature; and transferring at least one of the feature information associated with the first feature to the third image using the second registration.

15. The method of claim 8, further comprising transferring the first feature to the first image from the initial image in which the first feature is visible.

16. A non-transitory, computer-readable storage medium having stored thereon computer-executable instructions for a registration chaining engine, the instructions, when executed, configure a processor to:

receive a first image having a first feature and a second feature visible, the first image being acquired after a first step of a procedure, wherein feature information associated with the first feature, which indicates the first feature in the first image, is transferred to the first image from an initial image via a registration between the first image and the initial image, wherein the initial image is different from the first image;

acquire a second image after a second step of a procedure, the second image having at least the second feature visible;

register the first image to the second image based on the second feature visible in both the first image and the second image; and transfer the feature information associated with the first feature to the second image based on the registration, wherein, after the transfer, the feature information associated with the first feature indicates the first image in the second image.

17. The non-transitory computer-readable storage medium of claim 16, further storing instructions that configure the processor to:

acquire a third image following the procedure, the third image having a third feature visible, the third feature also being visible in the second image;

register the second image to the third image based on the third feature; and transfer the feature information associated with the first feature to the third image based on the registration of the second image to the third image.

18. The non-transitory, computer-readable storage medium of claim 16, further storing instructions that configure the processor to transfer the first feature to the first image from the initial image acquired prior to the procedure.

19. The non-transitory, computer-readable storage medium of claim 17, wherein the first image, second image, and third image have different modalities.

* * * * *